Patented Mar. 17, 1936

2,034,070

UNITED STATES PATENT OFFICE 2,034,070

CLEANING COMPOSITION

Arthur S. Weygandt, Cleveland Heights, Ohio, assignor to The Grasselli Chemical Company, Cleveland, Ohio, a corporation of Delaware No Drawing. Application May 31, 1934, Serial No. 728,387

3 Claims. (Cl. 87—5)

The present invention refers to cleaning composition particularly for household uses which comprises sodium bisulfate and partially dehydrated magnesium chloride hydrates.

Sodium bisulfate is used extensively as a cleaning compound for household use. It has also been suggested to mix sodium chloride with sodium bisulfate to increase the efficiency of the mixture.

Such mixtures of an acid salt and a chloride have the great disadvantage that in dry form and in a moist atmosphere they slowly liberate hydrochloric acid gas which is very corrosive.

I have found that this drawback of the dry mixtures of acid sulfate and chloride can be substantially completely overcome if I mix with the sodium bisulfate a partially dehydrated magnesium chloride hydrate which on its surface has a film or layer of magnesium oxide.

On heating magnesium chloride hydrates they slowly decompose with evolution of hydrochloric acid gas and formation of magnesium oxide. By conducting this operation carefully on discrete particles of a magnesium chloride hydrate the decomposition takes place on the surface only resulting in a product which has on its outside a film or coating of a basic magnesium compound which for matter of simplicity I shall call magnesium oxide.

The novel cleaning composition of my invention comprises therefor discrete particles of sodium bisulfate mixed with discrete particles of partially dehydrated magnesium chloride hydrate, or magnesium chloride particles having on their surface a slight coating of magnesium oxide.

The proportionate amount of the two compounds in the mixture is in no way critical, though it is naturally preferable to use a preponderant amount of sodium bisulfate which is the ingredient, the cleaning action of which is mainly relied upon, in the composition, the magnesium chloride having only the function of forming some hydrochloric acid when the cleaning composition is added to water.

I can add to the mixtures of sodium bisulfate and partially dehydrated magnesium chloride various inert materials, such as talcum, kieselguhr, or other abrasives without detracting from the advantages of the combination of the two main ingredients.

Besides suppressing the formation of hydrochloric acid gas in the solid mixtures, the use of magnesium chloride particles, the surface of which has been partially dehydrated, prevents the further advantage that mixtures of the two components are less liable to cake and harden on storage.

The mixtures of sodium bisulfate and surface dehydrated magnesium chloride hydrates can be prepared from the finely ground individual compounds.

It is, however, convenient and for many purposes preferable to use the two components in either globular or flake form.

In producing magnesium chloride in globular form it is easy to conduct the operations in such a manner that the globules as formed are submitted to a current of dehydrating gas whereby they lose water and some hydrochloric acid gas, leaving on the surface of the globules a coating of magnesium oxide. Similarly the flaking of magnesium chloride hydrates can be so conducted as to produce a product which has a thin surface layer of magnesium oxide. It is, of course, also possible to take preformed magnesium chloride hydrate globules or flakes and partially dry them until a film of magnesium oxide is formed on their surface.

Magnesium chloride flakes containing 48.3% $MgCl_2$ were dried in an oven at 95° C. until a thin, white opaque film of a basic magnesium compound was formed over the entire surface of the flakes, the $MgCl_2$ content on basis of chlorine rising to 50.7%. These flakes were mixed with dry sodium bisulfate flakes, the mixture containing 10% of the partially dehydrated magnesium chloride. This mixture was non-segregating and chemically stable.

A similar mixture was prepared from undehydrated magnesium chloride. There was an almost immediate chemical reaction with evolution of hydrochloric acid gas.

I claim:

1. A cleaning composition which will liberate HCl when dissolved in water comprising discrete particles of sodium bisulfate and discrete particles of heat treated magnesium chloride which have formed on their surface only as a result of said heat treating a surface film of a basic magnesium compound and having a core of magnesium chloride, said composition being substantially non-caking and does not liberate hydrochloric acid gas when dry.

2. The composition of claim 1 in which the particles are globular in shape.

3. The composition of claim 1 in which the particles are in flake form.

ARTHUR S. WEYGANDT.